US012690519B2

(12) United States Patent
Fay, II et al.

(10) Patent No.: US 12,690,519 B2
(45) Date of Patent: Jul. 28, 2026

(54) AGRICULTURAL VEHICLE HAVING AN ACTIVELY VARIABLE SWATH GATE POSITION

(71) Applicant: CNH Industrial America LLC, New Holland, PA (US)

(72) Inventors: Jeffrey B. Fay, II, Oxford, PA (US); Garin R. Ingalls, Lititz, PA (US); Kevin Cordes, Glenmoore, PA (US)

(73) Assignee: CNH Industrial America LLC, New Holland, PA (US)

( * ) Notice: Subject to any disclaimer, the term of this patent is extended or adjusted under 35 U.S.C. 154(b) by 1022 days.

(21) Appl. No.: 17/886,280

(22) Filed: Aug. 11, 2022

(65) Prior Publication Data

US 2024/0049639 A1      Feb. 15, 2024

(51) Int. Cl.
| | |
|---|---|
| *A01D 41/127* | (2006.01) |
| *A01D 43/10* | (2006.01) |
| *A01D 82/02* | (2006.01) |

(52) U.S. Cl.
CPC ......... *A01D 43/102* (2013.01); *A01D 41/127* (2013.01); *A01D 82/02* (2013.01)

(58) Field of Classification Search
CPC .... A01D 43/102; A01D 82/02; A01D 41/127; A01D 43/10
See application file for complete search history.

(56) References Cited

U.S. PATENT DOCUMENTS

| | | | | |
|---|---|---|---|---|
| 5,930,988 | A * | 8/1999 | Hanson .................. | A01D 82/00 56/192 |
| 10,091,935 | B2 | 10/2018 | Treffer et al. | |
| 10,772,257 | B2 | 9/2020 | Rotole et al. | |
| 10,785,914 | B2 * | 9/2020 | Treffer .................. | A01D 57/26 |
| 10,806,078 | B2 | 10/2020 | Rotole et al. | |
| 2020/0205345 | A1 | 7/2020 | Bollinger et al. | |

FOREIGN PATENT DOCUMENTS

| | | | | |
|---|---|---|---|---|
| CA | 3004658 A1 * | 11/2018 | .......... | A01D 41/127 |
| DE | 4211332 C1 | 8/1993 | | |
| DE | 4344585 A1 | 6/1995 | | |
| EP | 3400782 A1 * | 11/2018 | .......... | A01D 43/102 |
| EP | 3400782 B1 | 1/2020 | | |
| WO | 20180178318 A1 | 10/2018 | | |

OTHER PUBLICATIONS

Extended European Search Report for EP Application 23190942.5 dated Dec. 21, 2023 (eight pages).

* cited by examiner

*Primary Examiner* — Joseph M Rocca
*Assistant Examiner* — Ashley A Kaercher
(74) *Attorney, Agent, or Firm* — Buchanan Ingersoll & Rooney PC

(57) ABSTRACT

An agricultural machine system includes: a mower-conditioner machine including a mower-conditioner machine frame, a plurality of conditioner rolls coupled with the mower-conditioner machine frame, and a pivotable swath gate coupled with the mower-conditioner machine frame; a control system operatively coupled with the mower-conditioner machine frame, the control system including: a controller system configured for: determining a swath gate position adjustment based at least in part on a conditioner speed of the plurality of conditioner rolls.

15 Claims, 7 Drawing Sheets

AGRICULTURAL VEHICLE HAVING AN ACTIVELY VARIABLE SWATH GATE POSITION

FIELD OF THE INVENTION

The present invention pertains to agricultural machines, and, more specifically, to mower-conditioner machines.

BACKGROUND OF THE INVENTION

Generally speaking, forage (which can also be referred to herein as crop, crop material, forage crop, forage material, or forage crop material) is plant matter that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include cutting (which can be referred to as mowing), conditioning, tedding, raking, merging, chopping, baling, bale retrieval, transport, and/or storage, and silage-making operations can include not only cutting but also chopping, baling, and/or ensiling (or at least some sort of covering). A variety of agricultural harvesting machines can be used to perform these operations.

One such agricultural harvesting machine is a mower-conditioner machine (which can also be referred to as a mower-conditioner). Such mower-conditioner machines can be formed as a pull-type mower-conditioner coupled with a tractor, or, alternatively, a header attachment to a self-propelled windrower. Farmers may operate such mower-conditioners to cut any sort of crop material (hay crop, wheat, etc.) from a field, to immediately condition the crop material, and to deposit the cut crop into swaths or windrows on the field (hereinafter, windrow is used to refer to both swaths and windrows, unless stated otherwise). The cutting can be performed by a cutting mechanism of the mower-conditioner, the cutting mechanism (which can also be referred to as a cutter bar) being, for example, a series of rotary discs (which can be referred to as discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a swath gate of the mower-conditioner and, optionally, windrow shields of the mower-conditioner or the self-propelled windrower, before being deposited on the ground. That is, the swath gate on the mower-conditioner is used to direct crop material ejected from the conditioner either down toward the ground to deposit a wide swath or directed toward the windrow shields to form the windrow. Especially during swath formation, the distribution of crop is critical to provide uniform distribution and drying of the crop material. Distribution is so critical that some mower-conditioners include wedges located on the bottom of the swath gate, the wedges being engaged by streams of crop material coming out of the conditioner to spread the crop material into a more even distribution.

What is needed in the art is a way to improve positioning of the swath gate of the mower-conditioner.

SUMMARY OF THE INVENTION

The present invention provides a control system associated with the mower-conditioner configured for correlating a swath gate position with the conditioner speed of the conditioner rolls.

The invention in one form is directed to an agricultural machine system, including: a mower-conditioner machine including a mower-conditioner machine frame, a plurality of conditioner rolls coupled with the mower-conditioner machine frame, and a pivotable swath gate coupled with the mower-conditioner machine frame; a control system operatively coupled with the mower-conditioner machine frame, the control system including: a controller system configured for: determining a swath gate position adjustment based at least in part on a conditioner speed of the plurality of conditioner rolls.

The invention in another form is directed to a control system of an agricultural machine system, the agricultural machine system including a mower-conditioner machine and a control system, the mower-conditioner machine including a mower-conditioner machine frame, a plurality of conditioner rolls coupled with the mower-conditioner machine frame, and a pivotable swath gate coupled with the mower-conditioner machine frame, the control system operatively coupled with the mower-conditioner machine frame, the control system including: a controller system configured for determining a swath gate position adjustment based at least in part on a conditioner speed of the plurality of conditioner rolls.

The invention in yet another form is directed to a method of using an agricultural machine system, the method including the steps of: providing a mower-conditioner machine and a control system, the mower-conditioner machine including a mower-conditioner machine frame, a plurality of conditioner rolls coupled with the mower-conditioner machine frame, and a pivotable swath gate coupled with the mower-conditioner machine frame, the control system operatively being coupled with the mower-conditioner machine frame and including a controller system; and determining, by the controller system, a swath gate position adjustment based at least in part on a conditioner speed of the plurality of conditioner rolls.

An advantage of the present invention is that it provides an actively adjustable swath gate position using the conditioner speed and, optionally, the ground speed of the mower-conditioner. Thus, the position of the swath gate, and the automated adjustment of that position, is tied to the conditioner speed and, optionally, the ground speed of the mower-conditioner.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
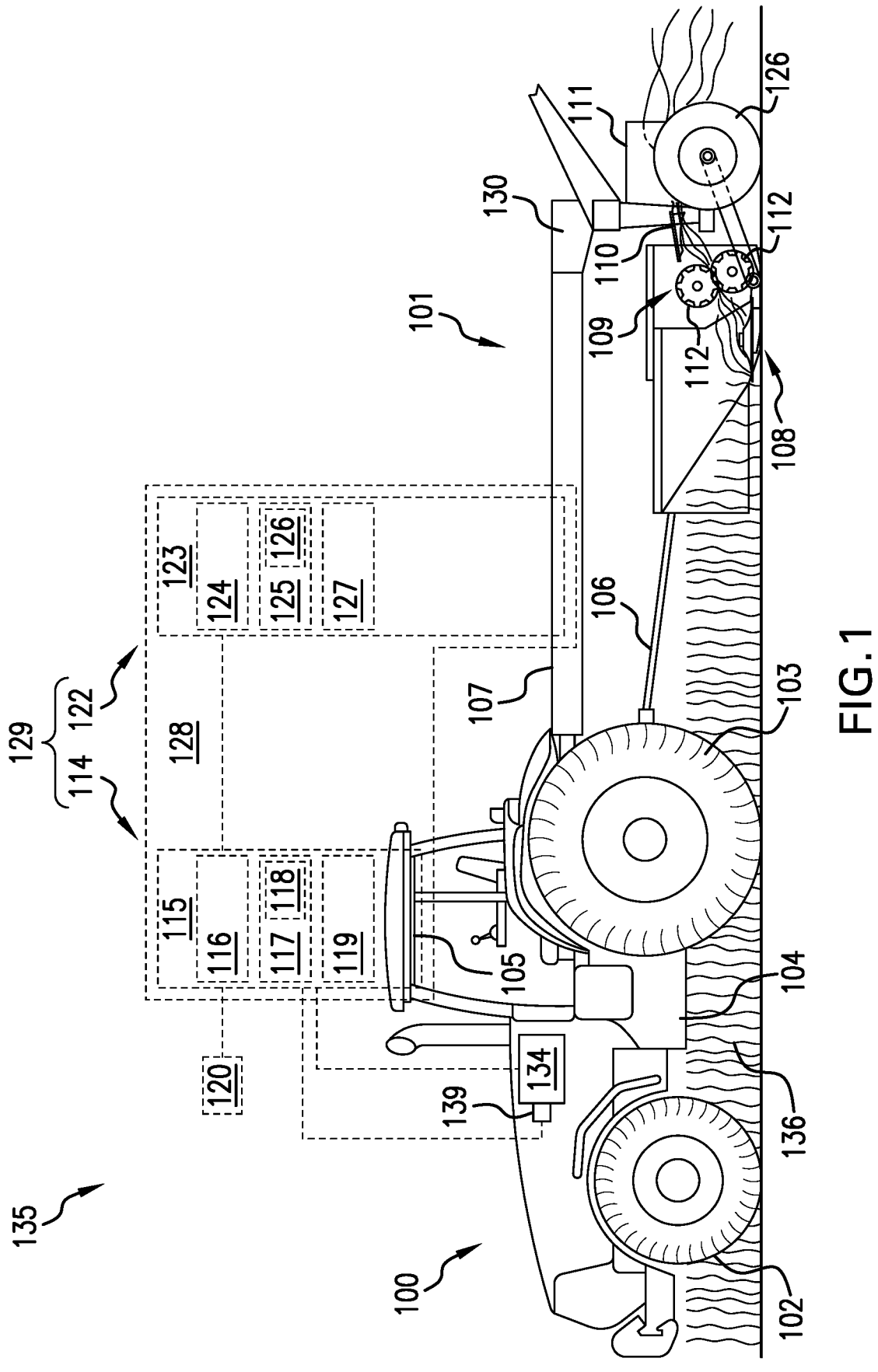
FIG. 1 illustrates schematically a side view of an exemplary embodiment of an agricultural machine system including an agricultural vehicle, formed as a tractor, a mower-conditioner machine, and a control system, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which can be referred to as an agricultural implement, an implement), which is formed as a mower-conditioner machine 101 (which can be referred to as a mower-conditioner) and is being towed by, and thus coupled with, agricultural work vehicle 100, agricultural machine 101 to perform an agricultural operation within a field, namely, mowing and conditioning. As shown, work vehicle 100 can be configured as an agricultural tractor. Further, agricultural machine system 135 includes a control system 129 (which can be referred to as a unified control system 129). Unified control system 129 includes control system 114 of tractor 100, control system 122 of mower-conditioner 101, and, optionally, a control system (not shown) of a data center (not shown) that is cloud-based, Internet-based, and/or remotely located (this control system of the data center can be substantially similar to control systems 114, 122, having a controller, a processor, memory, data, and instructions, as described below with respect to control systems 114, 122). Control system 114 includes controller 115, and control system 122 includes controller 123. Further, unified system 129 can be said to include controller system 128, which includes controllers 115, 123. Control system 129, and thus also control systems 114, 122, are operatively coupled with each of frames 104, 130, and thus also with tractor 100 and mower-conditioner 101. Control system 114, in whole or in part, is further included as part of work vehicle 100, and control system 122, in whole or in part, is further included as part of mower-conditioner 101.

Figure 6:
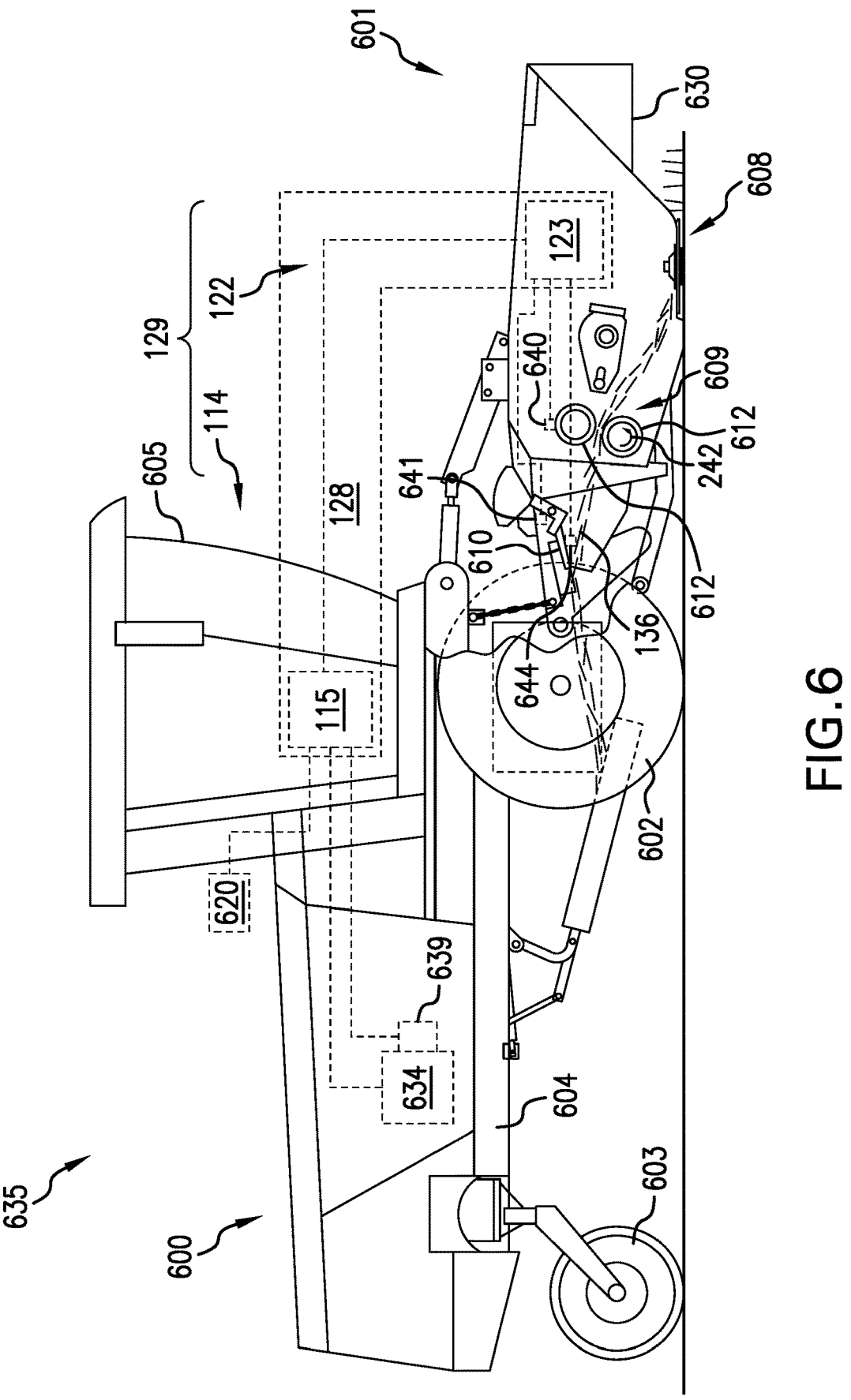
FIG. 6 illustrates schematically a side view of another exemplary embodiment of an agricultural machine system in accordance with an exemplary embodiment of the present invention.

Work vehicle 100 can be an operator-driven tractor or an autonomous tractor. However, in some embodiments, work vehicle 100 may correspond to any other suitable vehicle configured to tow a mower-conditioner machine across a field or that is otherwise configured to facilitate the performance of a mowing-conditioning operation, including an autonomous mower-conditioner vehicle. It should be further appreciated that mower-conditioner 101, while shown as being towed by tractor 100, may also be a self-propelled mower-conditioner that does not rely on a separate vehicle for propulsion and/or power to function (FIG. 6).

Work vehicle 100 includes a pair of front wheels 102, a pair of rear wheels 103, and a chassis 104 (which can also be referred to as a work vehicle frame 104 or tractor frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Control system 114, in whole or in part, can be coupled with frame 104.

As shown in FIG. 1, work vehicle 100 may be coupled to mower-conditioner 101 via a power take-off (PTO) 106 (which includes a PTO shaft, to which the arrow of 106 points in FIG. 1) and a tongue 107 to a hitch of work vehicle 100 to allow vehicle 100 to tow mower-conditioner 101 across the field.

As such, work vehicle 100 may, for example, guide mower-conditioner 101 toward crop material 136 standing in the field, such that mower-conditioner 101 in FIG. 1 is a pull-type mower-conditioner 101. As is generally understood, mower-conditioner 101, in addition to PTO 106 (which can be deemed to be part of tractor 100 or mower-conditioner 101) and tongue 107, includes frame 130, cutting mechanism 108, crop conditioner 109, a pivotable swath gate 110, and windrow shields 111 (cutting mechanism 108, crop conditioner 109, swath gate 110, and windrow shields 111 each being coupled with frame 130). Cutting mechanism 108 is configured for cutting standing crop material 136 and further conveying crop material 136 rearwardly. Cutting mechanism 108 can be configured as a plurality of rotating discs which sever crop material 136 (as shown in FIG. 1), or, alternatively, as a plurality of reciprocating knives (such as a sicklebar). In a crop flow direction, subsequent to cutting mechanism 108 crop material 136 encounters two conditioning rolls 109. Crop conditioner 109 includes two conditioner rolls 112 (which can also be referred to as conditioning rolls, and which are coupled with frame 130), which rotate opposite one another (in FIG. 1, the top roll 112 rotates counter-clockwise, and the bottom roll 112 rotates clockwise)) and form a gap therebetween, through which the cut crop material 136 flows so as to be conditioned (i.e., breaking, splitting, bending, crushing, cracking, and/or crimping crop material 136). One or both conditioner rolls 112 can be driven, at least indirectly, by a mechanical input to mower-conditioner 101, in this case, by the PTO shaft of PTO 106 so as to impart a motive force to crop material 136 rearward (described more fully below). Thus, conditioner rolls 112 rotate with a speed (revolutions per minute (RPM)), which can be referred to as a conditioner speed (herein, unless specified otherwise, the conditioner speed refers to the angular velocity of rolls 112, wherein velocity and speed can be used interchangeably herein). Subsequent to conditioner rolls 112, a mat of crop material 136 strikes an underside of swath gate 110, in order to form a wide swath of crop material on the ground, or a narrower windrow, depending upon positioning of swath gate 110. Subsequent to swath gate 110, crop material 136 can, optionally strike windrow shields 111 (which can also be referred to as side shields), which can be positioned so as to form a windrow of crop material 136 on the ground.

Further, work vehicle 100 includes control system 114, which includes controller 115, which includes a processor 116, memory 117, data 118, and instructions 119. Control system 114 can further include an input/output device 120 such as a laptop computer (with keyboard and display), a touchpad (including keypad functionality and a display), and/or one or more switches, device 120 being configured for a user to interface therewith. Device 120 can be a plurality of devices spaced apart, for example, in cab 105 that allows operator to make inputs to controller 115.

Further, mower-conditioner 101 includes control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of mower-conditioner 101. Further, mower-conditioner 101 includes a frame 130 (which can be referred to as mower-conditioner machine frame 130, or more generally as a machine frame 130) to which all of the components of mower-conditioner 101 are directly or indirectly coupled. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement, or a header.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Tractor controller 115, herein, is assumed to be the primary controller for controlling operations of tractor 100, and mower-conditioner controller 123, herein, is assumed to be the primary controller for controlling operations of mower-conditioner 101, though it is understood that at different times each of controllers 115, 123 can control any of the other of the controllers 115, 123. Controllers 115, 123, as indicated in FIG. 1, can be in communication with the other of controllers 115, 123, thereby forming unified control system 129, such that any or all information associated with any controller 115, 123 can be shared with the other of controllers 115, 123, and any controller 115, 123 can perform the functions of the other controllers 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123 can be configured to perform any of the functions of any of the other controllers 115, 123. Controllers 115, 123 can be a part of any network facilitating such communication therebetween, such as a local area network, a metropolitan area network, a wide area network, a neural network, whether wired or wireless. Control system 129, and controller system 128, are operatively coupled with tractor 100 and mower-conditioner 101, in particular with frames 104, 130. According to an embodiment of the present invention, tractor controller 115 can issue commands to mower-conditioner controller 123. This is assumed to be the case herein, unless otherwise stated. According to an alternative embodiment of the present invention, mower-conditioner controller 123 can issue commands to tractor controller 115 (such as for ISOBUS III or higher implements and/or vehicles). This is assumed to be the case herein, unless otherwise stated.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controllers 115, 123. Similarly, control system 122 can further include a GPS (not shown) mounted on mower-conditioner 101 (the mower-conditioner GPS). The mower-conditioner GPS senses the location of mower-conditioner 101 within the field, as is known, and this data can be provided to controllers 115, 123. Further, the operator, by way of device 120, can input or make certain settings. Control system 129 can further include any number additional control systems (with their individual controllers, processors, memory, data, and instructions, substantially similar to what is described above with reference to control systems 114, 122), and any such control system can have input/output devices as a part thereof and/or connected thereto.

Work vehicle 100 further includes a ground speed mechanism 134, coupled with frame 104. Ground speed mechanism 134 is well-known and thus will not be discussed in detail, but generally serves to cause work vehicle 100 to accelerate, to decelerate, or to maintain a constant speed across the ground, such as a field. For purposes herein, ground speed mechanism 134 can further include a braking system of work vehicle 100, which is well-known and thus will not be discussed in detail, but generally serves to cause the work vehicle to slow down or to stop. Ground speed mechanism 134 is operatively coupled with control system 114 by, for example, any suitable sensors and actuators known in the art for automatically controlling ground speed mechanism 134 of an automotive vehicle, wherein such sensors and actuators can be deemed to be included within both ground speed mechanism 134 and control system 114. Such sensors include one or more ground speed sensors 139 configured for sensing a ground speed of work vehicle 100 and for outputting a ground speed signal (that is, the agricultural work vehicle ground speed signal) corresponding to the ground speed of vehicle 100 to controller 115, and thus also to controller 123. Further, because in this embodiment of the present invention vehicle 100 pulls mower-conditioner 101, the ground speed of vehicle 100 is also a ground speed of mower-conditioner 101; thus, the ground speed of the mower-conditioner 101 is associated with the ground speed of the vehicle 100.

Figure 2:
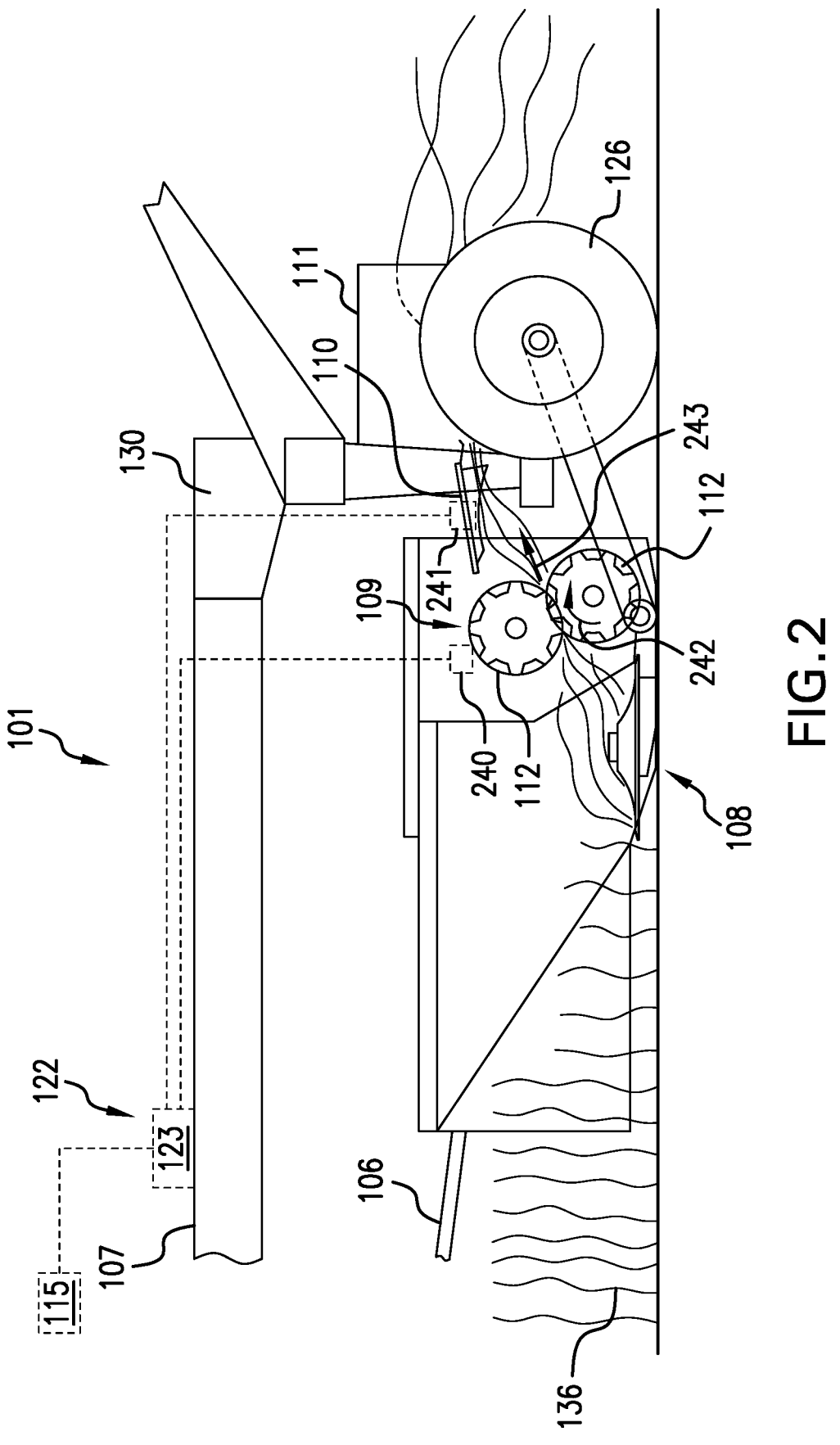
FIG. 2 illustrates schematically a side view of the mower-conditioner of FIG. 1, in accordance with an exemplary embodiment of the present invention.

Referring now to FIG. 2, there is shown schematically a side view of mower-conditioner 101. Mower-conditioner 101, and also control system 122, further includes at least one sensor 240 and at least one sensor 241, each coupled with frame 130. Sensor 240 is configured for sensing the conditioner speed of conditioner rolls 112, which can be configured to rotate at substantially the same speed as one another. The conditioner speed (unless specified otherwise herein) refers most specifically to the angular velocity 242 ($\omega$) of conditioner rolls 112, though alternatively conditioner speed could refer to linear velocity ($v_c$) of rolls 112, considering that angular velocity and linear velocity are related by mathematical formula (linear velocity ($v_c$)=angular velocity ($\omega$) times (*) the radius (r), here, the radius from a rotational axis of a respective roll 112 to a perimeter surface of the respective roll 112 which crop material 136 contacts (which can be referred to as the effective perimeter)). Herein, it is assumed that sensor 240 senses the angular velocity 242 (that is, the actual angular velocity ($\omega_{Act}$)) of at least one roll 112. As is known, the angular velocity 242 is measured about a rotational axis of a respective roll 112, and linear velocity 243 is measured about the effective perimeter of rolls 112. Further, sensor 240 outputs, to controller 123, a conditioner speed signal corresponding to the actual conditioner speed ($\omega_{Act}$) of conditioner rolls 112. Thus, sensor 240 is configured for: sensing the conditioner speed of rolls 112; and outputting, to controller 123 a conditioner speed signal corresponding to the conditioner speed of rolls 112. Further, the conditioner speed of conditioner rolls 112 is associated with a speed of cutting mechanism 108; that is, the conditioner speed is tied to the speed of cutting mechanism 108, such that a reduction, for example, in the speed of cutting mechanism 108 entails a reduction in the conditioner speed as well. Sensor 240 can sense the conditioner speed directly, by directly measuring angular velocity of conditioner roll 112. Alternatively or in addition thereto, sensor 240 can be positioned so as to sense the conditioner speed indirectly. More specifically, sensor can be configured to sense a speed of the PTO shaft and/or the speed of the cutting mechanism 108 (considering that conditioner 109 is driven by the PTO shaft, and the conditioner speed is tied to the speed of cutting mechanism 108), and controller 128 can be configured to correlate the speed of the PTO shaft and/or the speed of the cutting mechanism 108 with the conditioner speed.

Sensor 241 is coupled with frame 130 and is configured for: sensing a position of swath gate 110; outputting, to controller 123, a swath gate position signal corresponding to the position of swath gate 110. Sensor 241 can be any kind of sensor suitable for fulfilling these purposes, for example (and not by way of limitation), a potentiometer, or an internal cylinder position sensor. Regarding the latter, sensor 241 can be placed inside a cylinder of a hydraulic cylinder assembly or a pneumatic cylinder assembly, wherein sensor 241 senses a position of a piston or rod displacing in the cylinder of the respective assembly. Such an assembly can be, for example, an actuator 344 (explained below).

Figure 3:
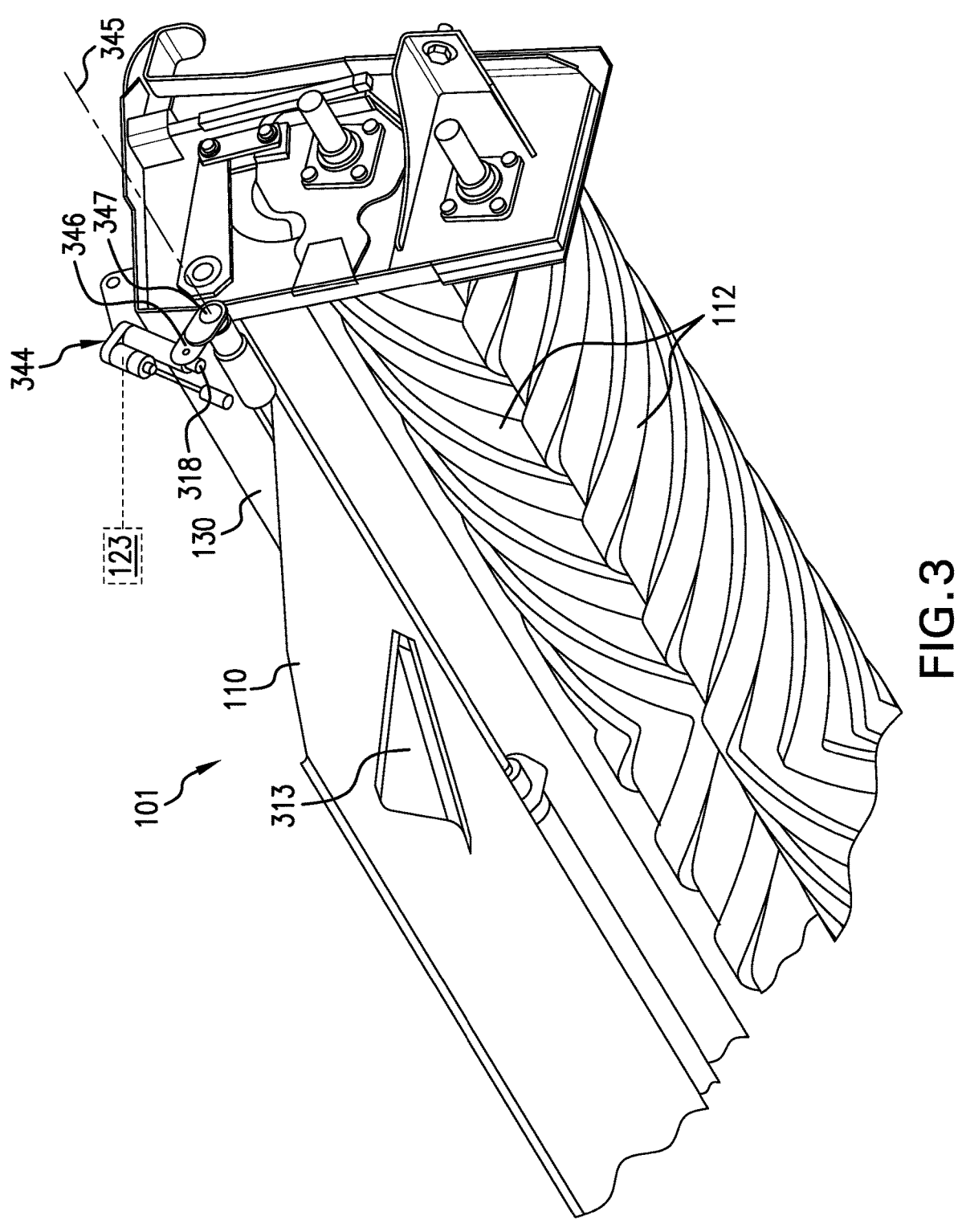
FIG. 3 illustrates schematically a perspective view of the mower-conditioner of FIG. 1, with portions broken away, the mower-conditioner including a swath gate, in accordance with an exemplary embodiment of the present invention.
Figure 4:
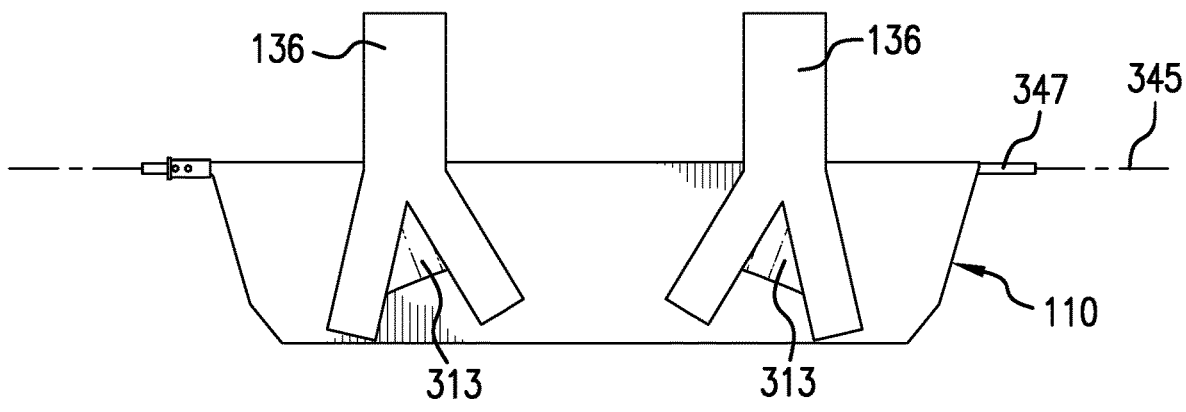
FIG. 4 illustrates a bottom view of the swath gate of FIG. 3, with portions broken away, in accordance with an exemplary embodiment of the present invention.

Referring now to FIG. 3, there is shown a bottom perspective view of the mower-conditioner of FIG. 1, with portions broken away. Mower-conditioner 101 is shown to include at least one wedge 313 on an underside of swath gate 110; as shown in FIG. 4, the underside of swath gate 110 can include two such wedges 313, for example. Wedges 313 are configured for spreading crop material 136 as crop material 136 strikes the underside of swath gate 110, as is known. Further, mower-conditioner 101 includes actuator 344, which is coupled with frame 130. Actuator 344 is configured for pivoting (and thus adjusting) swath gate 110 about a pivot axis 345 between a plurality of positions. In so doing, actuator 344 is coupled with a crank 346, which is connected with a pivot shaft 347, which is connected with swath gate 110. Actuator 344 can be any suitable actuator. By way of example and not limitation, actuator 344 can be a fluid actuator (such as a hydraulic actuator or a pneumatic actuator), an electric actuator (such as an electromechanical actuator or an electrohydraulic actuator), an electronic actuator, and/or a mechanical actuator. Herein, actuator 344 is discussed as being formed as a fluid actuator, more specifically, as a hydraulic actuator assembly, according to an exemplary embodiment of the present invention. Such a hydraulic cylinder assembly 344 can include a cylinder (which can also be referred to as a barrel), a piston, and a rod 348, can be single-acting or double-acting, can be in a hydraulic closed circuit or an open circuit, and can use hydraulic oil as its working fluid. Rod 348 is coupled with crank 346, such that as rod 348 moves between a fully retracted position and a full extended position, rod 348 causes crank 346 to pivot about axis 345, causing shaft 347 to pivot about axis 345, causing swath gate 110 to pivot about axis 345 between up and down positions and at points therebetween.

Referring now to FIG. 4, there is shown a bottom view of swath gate 110. Swath gate 110 is shown to include two wedges 313 on the underside of swath gate 110. Further, FIG. 4 shows crop material engaging the underside of swath gate 110. More specifically, for illustrative purposes, two streams of crop material 136 are shown to engage swath gate 110. Each stream is directed towards a respective wedge 313, which separates the respective stream into branches, which further spreads crop material 136 laterally so as to provide a desirable distribution of crop material 136 on the ground.

Figure 5:
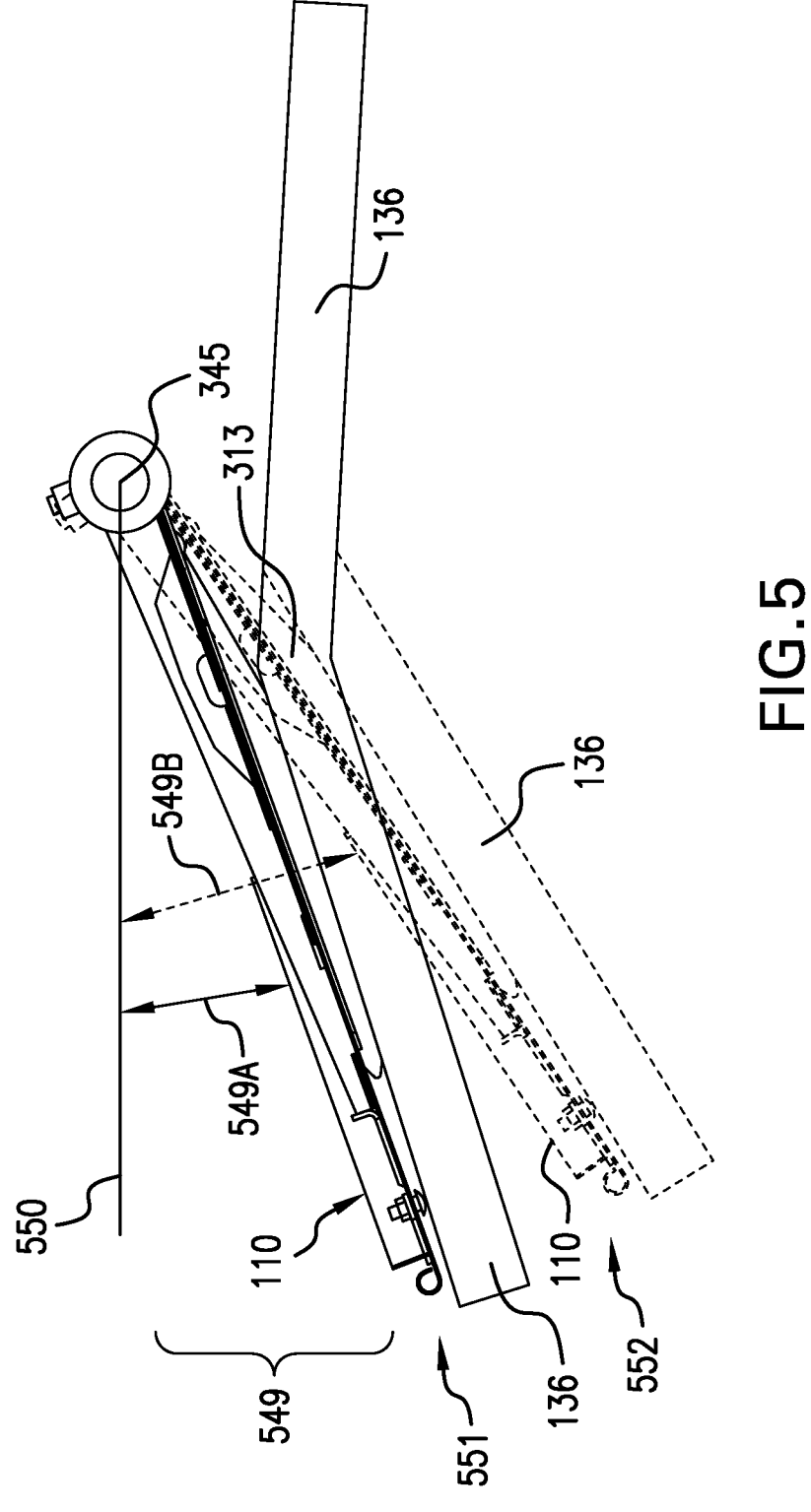
FIG. 5 illustrates a side view of the swath gate of FIG. 3, with portions broken away, in accordance with an exemplary embodiment of the present invention.

Referring now to FIG. 5, there is shown a side view of swath gate 110, with portions broken away. More specifically, swath gate 110 is shown in two different positions, a first (up) position and a second (down) position (in broken lines). In up position 551 swath gate 110 makes an angle 549A with horizontal line 550, and in down position 552 swath gate 110 makes an angle 549B with horizontal line 550 (angle 549A being more acute than angle 549B). Further, FIG. 5 shows crop material engaging swath gate 110 in each position 551, 552.

Thus, in accordance with optimal operation generally speaking, up position 551 of swath gate 110 is for high conditioner speeds, wherein crop material 136 engages swath gate 110 at angle 549A and thus spreads less aggressively. Down position 552 of swath gate 110 is for lower conditioner speeds, wherein crop material 136 engages wedges 313 of swath gate 110 at angle 549B (which can be described as an abrupt angle), thereby spreading crop material more aggressively. Thus, as the conditioner speed (understood as angular velocity ($\omega$)) and thus the speed of crop material 136 increases, the angle 549 between swath gate 110 and horizontal line 550 decreases. Conversely, as the conditioner speed (understood as angular velocity ($\omega$)) and thus the speed of crop material 136 decreases, the angle 549 between swath gate 110 and horizontal line 550 increases.

Further, controller system 128, by way of controllers 115, 123, is configured for: (1) receiving the swath gate position signal, the conditioner speed signal, and the agricultural work vehicle ground speed signal; (2) determining a swath gate position adjustment based at least in part on the conditioner speed signal, or, optionally, based at least in part on the swath gate position signal, the conditioner speed signal, and the agricultural work vehicle ground speed signal; and (3) outputting, to actuator 344, a swath gate position adjustment signal, based at least in part on the swath gate position adjustment.

Further, while use of wedges 313 is effective at spreading crop material 136 in most conditions, testing has shown that the conditioner speed, and thus the speed of crop material 136 exiting conditioner 109, has an effect on the magnitude of the spread provided by wedges 313. For example, at high conditioner speeds, crop material 136 engages wedges 313 very aggressively and spreads more than at slower conditioner speeds. Since the conditioner speed is tied to the speed of cutting mechanism 108, it isn't an option to reduce the conditioner speed to reduce the spreading; rather, an operator has been, prior to the present invention, required to raise swath gate so that the crop material engages the swath gate at a more acute angle, resulting in the crop material not being spread as aggressively. Likewise, when slow conditioner speeds are being used, the swath gate must be lowered to provide a more direct contact of the crop material with the wedges to more aggressively spread the crop material. The present invention thus provides an automated system to adjust swath gate 110 during operation. This can be achieved according to the present invention, as described herein.

In use, device 120 allows the operator to make an initial setting for the position of swath gate 110 or a desired swath width on the ground. Upon entering a field, the operator can input a baseline position of swath gate 110 or swath width for operation. This can be made either based on operator experience or selected from a pre-loaded option (i.e., swath gate position 1, 2, 3 . . . n, or swath width) at an operator selected conditioner speed or speed of cutting mechanism 108 (since swath gate 110 and cutting mechanism 108 are tied together, a setting of one effectively sets the other) and an operator selected ground speed of tractor 100/mower-conditioner 101 (such a selection can be made via device 120 and/or by, for instance, an accelerator pedal). Controller 128 records all of these settings. During operation after the initial settings have been selected, the operator may change the speed of cutting mechanism 108 or the ground speed to optimize cut quality, maximize productivity, and/or reduce machine wear and tear (i.e., when encountering a rough field). Controller 128 automatically adjusts the position of swath gate 110 when these changes are made, to optimize swath formation. For example, if the operator slows the speed of cutting mechanism 108/conditioner speed to improve cut quality, controller 128 will lower swath gate 110, to engage crop material more aggressively with swath gate wedges 313 and to maintain the spread of crop material. If the operator increases the speed of cutting mechanism 108/conditioner speed, controller 128 will raise swath gate 110 to maintain the spread of crop material 136. Likewise, if the ground speed of tractor 100/mower-conditioner 101 is reduced due to ground conditions for example, controller 128 will lower swath gate 110 for more engagement by wedges 313. On the other hand, an increase in the ground speed of tractor 100/mower-conditioner 101 will cause controller 128 to raise swath gate 110 (possibly due to more volumetric flow of crop material 136 striking rolls 112 at higher ground speeds, a lower angle 549 is adequate to achieve a satisfactory spread of crop material 136). Further, alternatively or in addition thereto, all of the adjustments of settings described as having been made by the operator in this paragraph can be adjustments made by an automated system capable of adjusting the speed of cutting mechanism 108/conditioner speed, the ground speed of tractor 100/mower-conditioner 101, and the position of swath gate 110, and the like.

Referring now to FIG. 6, there is shown agricultural machine system 635, according to another exemplary embodiment of the present invention. Many prior reference numbers with respect to agricultural machine system 135 are increased by a multiple of 100 and thus are substantially similar to the structures and function described and shown with respect to FIGS. 1-5, unless otherwise shown and/or described differently. Thus, agricultural machine system 135 is labeled as 635 in FIG. 6. Agricultural machine system 635 includes self-propelled windrower 600 and header 601, which is a mower-conditioner 601. Windrower 600 includes frame 604, front wheels 602, rear wheels 603, cab 605, input/output device 620, ground speed mechanism 634, ground speed sensor 639, control system 114, and can optionally include windrow shields (not labeled), instead of on mower-conditioner 601. Mower-conditioner 601 includes cutting mechanism 608, conditioner 609 including conditioner rolls 612 (with angular velocity 242), swath gate 610, control system 122, conditioner speed sensor 640, swath gate position sensor 641, and actuator 644. System further includes unified control system 129 including control systems 114, 122 and controller system 128. Control system 114 includes controller 115, and control system 122 includes controller 123. System 635 is used in a manner substantially similar to what is described above with respect to system 135.

Figure 7:
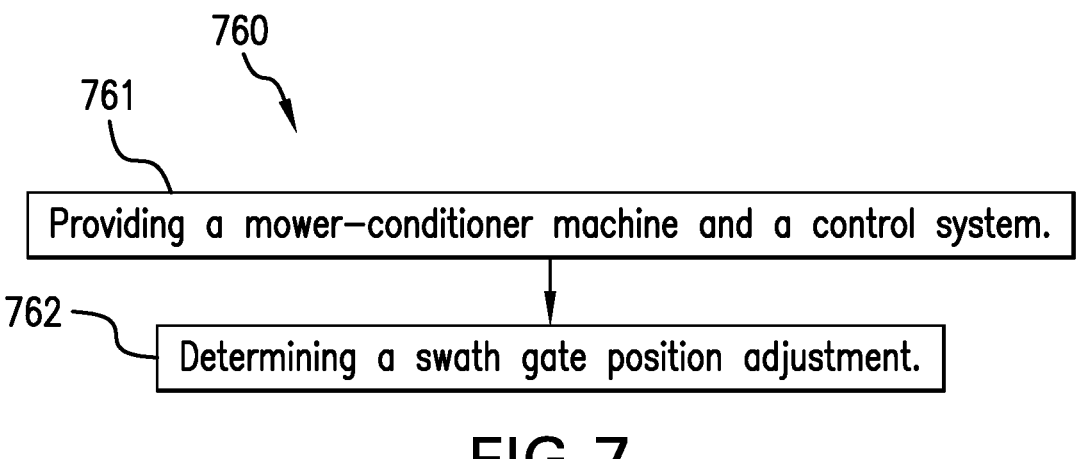
FIG. 7 illustrates a flow diagram showing a method of using an agricultural machine system, in accordance with an exemplary embodiment of the present invention.

Referring now to FIG. 7, there is shown a flow diagram showing a method 760 of using an agricultural machine system 135, 635, the method 760 including the steps of: providing 761 a mower-conditioner machine 101, 601 and a control system 129, the mower-conditioner machine 101, 601 including a mower-conditioner machine frame 130, 630, a plurality of conditioner rolls 112, 612 coupled with the mower-conditioner machine frame 130, 630, and a pivotable swath gate 110, 610 coupled with the mower-conditioner machine frame 130, 630, the control system 129 operatively being coupled with the mower-conditioner machine frame 130, 630 and including a controller system 128; and determining 762, by the controller system 128, a swath gate position adjustment based at least in part on a conditioner speed of the plurality of conditioner rolls 112, 612. Further, the method 760 can further include an agricultural work vehicle 100, 600, wherein the mower-conditioner machine 101, 601 is coupled with the agricultural work vehicle 100, 600 and includes a cutting mechanism 108, 608 coupled with the mower-conditioner machine frame 130, 630, a ground speed of the mower-conditioner machine 101, 601 being associated with a ground speed of the agricultural work vehicle 100, 600, and the conditioner speed of the plurality of conditioner rolls 112, 612 being associated with a speed of the cutting mechanism 108, 608. Further, the control system 129 can include: a first sensor 241, 641 configured for: sensing a swath gate position; outputting a swath gate position signal corresponding to the swath gate position; a second sensor 240, 640 configured for: sensing the conditioner speed of the plurality of conditioner rolls 112, 612; outputting a conditioner speed signal corresponding to the conditioner speed of the plurality of conditioner rolls 112, 612. Further, the control system 129 can include a third sensor 139, 639 configured for: sensing the ground speed of the agricultural work vehicle 100, 600; outputting an agricultural work vehicle ground speed signal corresponding to the ground speed of the agricultural work vehicle 100, 600. Further, the controller system 128 can be further configured for: receiving the swath gate position signal, the conditioner speed signal, and the agricultural work vehicle ground speed signal; determining the swath gate position adjustment based at least in part on the swath gate position signal, the conditioner speed signal, and the agricultural work vehicle ground speed signal; outputting a swath gate position adjustment signal, based at least in part on the swath gate position adjustment.

It is to be understood that the steps of method 760 are performed by controller 115, 123, 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 128 described herein, such as the method 760, is implemented in software code or instructions which are tangibly stored on a tangible computer readable medium. The controller 115, 123, 128 loads the software code or instructions via a direct interface with the computer readable medium or via a wired and/or wireless network. Upon loading and executing such software code or instructions by controller 115, 123, 128, controller 115, 123, 128 may perform any of the functionality of controller 115, 123, 128 described herein, including any steps of the method 760.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:
    a mower-conditioner machine including a mower-conditioner machine frame, a plurality of conditioner rolls coupled with the mower-conditioner machine frame, and a pivotable swath gate coupled with the mower-conditioner machine frame to pivot between a raised position and a lowered position; and
    a control system operatively coupled with the mower-conditioner machine frame, the control system including:
        a controller system configured for:
            determining a swath gate position adjustment based at least in part on a conditioner speed of the plurality of conditioner rolls, wherein the swath gate position adjustment corresponds to the pivotable swath gate being moved to the raised position at a first conditioner speed of the plurality of conditioner rolls and the swath gate position adjustment corresponds to the pivotable swath gate being moved to the lowered position at a second conditioner speed of the plurality of conditioner rolls that is less than the first conditioner speed.

2. The agricultural machine system of claim 1, further comprising an agricultural work vehicle, wherein the mower-conditioner machine is coupled with the agricultural work vehicle and includes a cutting mechanism coupled with the mower-conditioner machine frame, a ground speed of the mower-conditioner machine being associated with a ground speed of the agricultural work vehicle, and the conditioner speed of the plurality of conditioner rolls being associated with a speed of the cutting mechanism.

3. The agricultural machine system of claim 2, wherein the control system further includes:
    a first sensor configured for:
        sensing a swath gate position;

outputting a swath gate position signal corresponding
to the swath gate position;
a second sensor configured for:
sensing the conditioner speed of the plurality of con-
ditioner rolls;
outputting a conditioner speed signal corresponding to
the conditioner speed of the plurality of conditioner
rolls.

4. The agricultural machine system of claim 3, wherein
the control system further includes a third sensor configured
for:
sensing the ground speed of the agricultural work vehicle;
outputting an agricultural work vehicle ground speed
signal corresponding to the ground speed of the agri-
cultural work vehicle.

5. The agricultural machine system of claim 4, wherein
the controller system is further configured for:
receiving the swath gate position signal, the conditioner
speed signal, and the agricultural work vehicle ground
speed signal;
determining the swath gate position adjustment based at
least in part on the swath gate position signal, the
conditioner speed signal, and the agricultural work
vehicle ground speed signal;
outputting a swath gate position adjustment signal, based
at least in part on the swath gate position adjustment.

6. A control system of an agricultural machine system, the
agricultural machine system including a mower-conditioner
machine and a control system, the mower-conditioner
machine including a mower-conditioner machine frame, a
plurality of conditioner rolls coupled with the mower-con-
ditioner machine frame, and a pivotable swath gate coupled
with the mower-conditioner machine frame to pivot between
a raised position and a lowered position, the control system
operatively coupled with the mower-conditioner machine
frame, the control system comprising:
a controller system configured for determining a swath
gate position adjustment based at least in part on a
conditioner speed of the plurality of conditioner rolls,
wherein the swath gate position adjustment corre-
sponds to the pivotable swath gate being moved to the
raised position at a first conditioner speed of the
plurality of conditioner rolls and the swath gate posi-
tion adjustment corresponds to the pivotable swath gate
being moved to the lowered position at a second
conditioner speed of the plurality of conditioner rolls
that is less than the first conditioner speed.

7. The control system of claim 6, wherein the control
system is configured for being a part of the agricultural
machine system which further includes an agricultural work
vehicle, wherein the mower-conditioner machine is coupled
with the agricultural work vehicle and includes a cutting
mechanism coupled with the mower-conditioner machine
frame, a ground speed of the mower-conditioner machine
being associated with a ground speed of the agricultural
work vehicle, and the conditioner speed of the plurality of
conditioner rolls being associated with a speed of the cutting
mechanism.

8. The control system of claim 7, wherein the control
system further includes:
a first sensor configured for:
sensing a swath gate position;
outputting a swath gate position signal corresponding
to the swath gate position;
a second sensor configured for:
sensing the conditioner speed of the plurality of con-
ditioner rolls;

outputting a conditioner speed signal corresponding to
the conditioner speed of the plurality of conditioner
rolls.

9. The control system of claim 8, wherein the control
system further includes a third sensor configured for:
sensing the ground speed of the agricultural work vehicle;
outputting an agricultural work vehicle ground speed
signal corresponding to the ground speed of the
agricultural work vehicle.

10. The control system of claim 9, wherein the controller
system is further configured for:
receiving the swath gate position signal, the conditioner
speed signal, and the agricultural work vehicle ground
speed signal;
determining the swath gate position adjustment based at
least in part on the swath gate position signal, the
conditioner speed signal, and the agricultural work
vehicle ground speed signal;
outputting a swath gate position adjustment signal, based
at least in part on the swath gate position adjustment.

11. A method of using an agricultural machine system, the
method comprising the steps of:
providing a mower-conditioner machine and a control
system, the mower-conditioner machine including a
mower-conditioner machine frame, a plurality of con-
ditioner rolls coupled with the mower-conditioner
machine frame, and a pivotable swath gate coupled
with the mower-conditioner machine frame to pivot
between a raised position and a lowered position, the
control system operatively being coupled with the
mower-conditioner machine frame and including a
controller system; and
determining, by the controller system, a swath gate posi-
tion adjustment based at least in part on a conditioner
speed of the plurality of conditioner rolls, wherein the
swath gate position adjustment corresponds to the
pivotable swath gate being moved to the raised position
at a first conditioner speed of the plurality of condi-
tioner rolls and the swath gate position adjustment
corresponds to the pivotable swath gate being moved to
the lowered position at a second conditioner speed of
the plurality of conditioner rolls that is less than the first
conditioner speed.

12. The method of claim 11, further comprising an agri-
cultural work vehicle, wherein the mower-conditioner
machine is coupled with the agricultural work vehicle and
includes a cutting mechanism coupled with the mower-
conditioner machine frame, a ground speed of the mower-
conditioner machine being associated with a ground speed
of the agricultural work vehicle, and the conditioner speed
of the plurality of conditioner rolls being associated with a
speed of the cutting mechanism.

13. The method of claim 12, wherein the control system
further includes:
a first sensor configured for:
sensing a swath gate position;
outputting a swath gate position signal corresponding
to the swath gate position;
a second sensor configured for:
sensing the conditioner speed of the plurality of con-
ditioner rolls;
outputting a conditioner speed signal corresponding to
the conditioner speed of the plurality of conditioner
rolls.

14. The method of claim 13, wherein the control system
further includes a third sensor configured for:
sensing the ground speed of the agricultural work vehicle;

outputting an agricultural work vehicle ground speed signal corresponding to the ground speed of the agricultural work vehicle.

15. The method of claim 14, wherein the controller system is further configured for:

receiving the swath gate position signal, the conditioner speed signal, and the agricultural work vehicle ground speed signal;

determining the swath gate position adjustment based at least in part on the swath gate position signal, the conditioner speed signal, and the agricultural work vehicle ground speed signal;

outputting a swath gate position adjustment signal, based at least in part on the swath gate position adjustment.

* * * * *